United States Patent
Jordanov

(10) Patent No.: US 7,725,281 B2
(45) Date of Patent: May 25, 2010

(54) METHOD FOR POLE-ZERO ADJUSTMENT IN RADIATION MEASUREMENT SYSTEMS

(75) Inventor: Valentin T. Jordanov, Los Alamos, NM (US)

(73) Assignee: Canberra Industries, Inc., Meriden, CT (US)

( * ) Notice: Subject to any disclaimer, the term of this patent is extended or adjusted under 35 U.S.C. 154(b) by 186 days.

(21) Appl. No.: 12/004,128

(22) Filed: Dec. 20, 2007

(65) Prior Publication Data

US 2008/0154529 A1   Jun. 26, 2008

Related U.S. Application Data

(60) Provisional application No. 60/876,349, filed on Dec. 21, 2006.

(51) Int. Cl.
*G01R 35/00* (2006.01)
*G01T 1/20* (2006.01)

(52) U.S. Cl. .................... 702/107; 250/363.01

(58) Field of Classification Search ............. 702/57, 702/66, 67, 69–71, 73, 74, 78, 79, 106, 107, 702/124–126, 190; 250/252.01, 363.01, 250/370.01, 370.07; 330/2
See application file for complete search history.

(56) References Cited

U.S. PATENT DOCUMENTS

| 4,491,799 | A | * | 1/1985 | Giardinelli ............... 330/2 |
| 5,872,363 | A | * | 2/1999 | Bingham et al. ....... 250/363.01 |
| 6,295,508 | B1 | * | 9/2001 | Trammell et al. ........... 702/107 |
| 6,347,288 | B1 | * | 2/2002 | Trammell et al. ........... 702/107 |

* cited by examiner

*Primary Examiner*—John H Le
(74) *Attorney, Agent, or Firm*—David W. Carstens; Carstens & Cahoon, LLP

(57) ABSTRACT

A method for automatic Pole-Zero adjustment in a radiation measurement system, the method including steps of: receiving a plurality of pulses from a radiation detector; for each of the plurality of pulses, synthesizing a multiple-peak pulse shape; and using the amplitude measurement of individual peaks in each of the multiple-peak pulse shapes to adjust the pole-zero of the radiation measurement system.

12 Claims, 10 Drawing Sheets

Double Peak Pulse Shape with Pole-Zero Overcompensation

Double Peak Pulse Shape with Proper Pole-Zero Compensation

Double Peak Pulse Shape with Pole-Zero Undercompensation

METHOD FOR POLE-ZERO ADJUSTMENT IN RADIATION MEASUREMENT SYSTEMS

CROSS-REFERENCE TO RELATED APPLICATION

The present application claims the benefit of U.S. Provisional Application of Ser. No. 60/876,349, filed Dec. 21, 2006, and titled METHOD AND APPARATUS FOR AUTOMATIC POLE-ZERO ADJUSTMENT IN RADIATION SPECTROMETERS.

BACKGROUND OF THE INVENTION

Radiation measurement systems (Radiation Spectrometers) are used to obtain radiation spectra or counting information of radiation (charge particles, photons, neutrons) that interact with a radiation detector. The signal from the radiation detector is a short current pulse that delivers a very small charge. This charge is converted to a voltage pulse using charge-sensitive preamplifier. Preamplifiers that are based on resistive-feedback produce pulses with short rise time and slow exponential decay—an exponential tail pulse. The exponential tail pulse passes through a pulse shaping network that produces short pulses with good signal-to-noise ratio. The first stage of the pulse shaping network performs differentiation in order to produce a pulse with shorter decay time than the pulse from the preamplifier. FIG. 1 shows a typical arrangement to differentiate the signal from the preamplifier.

The radiation detector (10) produces short current pulse I(s) (12) that is sensed by the preamplifier (20). The preamplifier has an amplifier (18) and feedback network of resistor (16) with value Rp and capacitor (14) with value Cp. The output of the preamplifier (20) is an exponential tail pulse $v_p(s)$ (22). The exponential tail pulse (22) pass through an CR differentiator (30) with capacitor (24) and resistor (26) with values Cd and Rd respectively. The combined response of the preamplifier (20) and the CR differentiator (30) then will result in a differentiated pulse $v_d(s)$ (28) with an undesirable undershoot. The differentiated pulse can be represented as an exponential tail pulse with decay time constant equal to the Cd*Rd minus a fraction of the preamplifier exponential tail pulse with decay time constant Cp*Rp. In other words, despite of the differentiation the long tail is still present in the differentiated pulse (28).

The undershoot of the differentiated pulse (28) can cause a significant spectral distortion, especially at high counting rates. Therefore, the goal of Pole-Zero Compensation is to remove the undershoot from the differentiated pulse. This goal is easily achieved by adding a fraction of the exponential tail pulse (22) to the differentiated pulse (28). FIG. 2 shows a classic Pole-Zero Compensation circuit using manual adjustment. The attenuator (32) is fed with the same signal as the CR-differentiator—the exponential tail pulse (22). The attenuator (32) is manually adjusted (trim pot, variable resistor) to provide an attenuated tail pulse $G^*v_p(s)$ (34). G is the attenuation coefficient and it is bounded between zero and one –0<G<1. The differentiated pulse (28) and the attenuated tail pulse (34) are added together by the analog adder (40). The analog addition can be done using passive resistive networks or active, amplifier based, summing circuit. The Pole-Zero exponential pulse v(s) (38) is delivered at the output of the analog adder (40). Depending on the value of G there are three possible categories of shapes for the Pole-Zero exponential pulse (38).

FIG. 3 shows cases of Overcompensated (60), Compensated (62), and Undercompensated (64) Pole-Zero exponential pulses. At the proper setting of G, the attenuated tail pulse (34) will completely compensate for the undershoot of the differentiated pulse (28), resulting in single time-constant (Cd*Rd) Pole-Zero exponential pulse (Compensated Pole-Zero Pulse). When G is greater than the optimum compensating value, the Pole-Zero exponential pulse will exhibit an overshoot (Overcompensated Pole-Zero Pulse). When G is less than optimum compensating value, the Pole-Zero exponential pulse will exhibit an undershoot (Undercompensated Pole-Zero Pulse).

When the Pole-Zero exponential pulses pass through linear pulse shaper (analog or digital), the overshoot/undershoot features are also present in the resulting shaped pulses. FIG. 4 illustrates shaped pulses resulting from Pole-Zero exponential pulses. An Overcompensated Pole-Zero pulse (60) will cause an Overcompensated Shaped Pulse (70) that will exhibit a longer decaying tail. A Compensated Pole-Zero pulse (62) will cause the fastest recovery to the baseline of the Compensated Shaped Pulse (72). The undershoot of the Undercompensated Pole-Zero pulse (64) will propagate to the Undercompensated Shaped Pulse (74).

The automatic Pole-Zero compensation uses digitally controlled attenuator (52) as shown in FIG. 5. The attenuation coefficient G is proportional to a digital value D (50). By changing the digital value (50), one can control the digitally attenuated tail pulse $G^*v_p(s)$ (54). The digitally controlled attenuator (52) could be a digitally controlled potentiometer, amplifier with digitally controlled gain or multiplying digital-to-analog converter (MDAC).

The automatic compensation of the Pole-Zero requires means to determine (estimate) whether the Pole-Zero is properly compensated, overcompensated or undercompensated. U.S. Pat. No. 4,866,400 (FIG. 6) uses analog boxcar average (82) connected to the output of pulse shaper (80). A comparator that is a part of the control circuit (84) examines the output of the Boxcar Average (82) and decides in which direction to change the digital value D (50). The condition for overshoot or undershoot is determined by examination of the baseline of pulse shaper (80) after each shaped pulse. U.S. Pat. No. 5,872, 363 extends the same technique into the digital domain. In both cases, the correct determination of the Pole-Zero state depends on the DC offset of the baseline. The DC offset of the base line causes errors that limit the accuracy of the automatic pole-zero compensation.

U.S. Pat. No. 6,374,192 (FIG. 7) uses a gated integrator (90), operating in the analog domain, to determine the compensation state of the Pole-Zero network. The conditions for overshoot or undershoot is determined by examining the slope of the flat part of the gated integrator pulse. The slope is determined from two amplitude measurements performed by an ADC (92). A Control Circuit (94) increments or decrements the digital value (50) when the slope is negative or positive respectively. As in the previous two cases the accuracy is affected by the DC offset of the baseline of the pulse shaper (80). A DC baseline offset will cause a non Pole-Zero related slope at the output of the gated integrator (90). To eliminate the effects of the baseline DC offset and the detector charge collection time on the automatic Pole-Zero compensation a new method and apparatus were developed.

BRIEF SUMMARY OF THE INVENTION

A method for automatic Pole-Zero adjustment in a radiation measurement system, said method comprising the steps of: receiving a plurality of pulses from a radiation detector; for each said plurality of pulses, synthesizing a multiple-peak pulse shape; and using amplitude measurement of individual peaks in each said multiple-peak pulse shapes to adjust pole-zero of said radiation measurement system.

BRIEF DESCRIPTION OF THE DRAWING

Understanding of the present invention will be facilitated by reference to the appended drawing figures, on which elements that have similar features or similar functions are given the same reference numerals throughout the various figures, on which the present invention is not intended to be limited thereto, and on which.

DETAILED DESCRIPTION OF THE PREFERRED MODE OF CARRYING OUT THE PRESENT INVENTION

Figure 1:
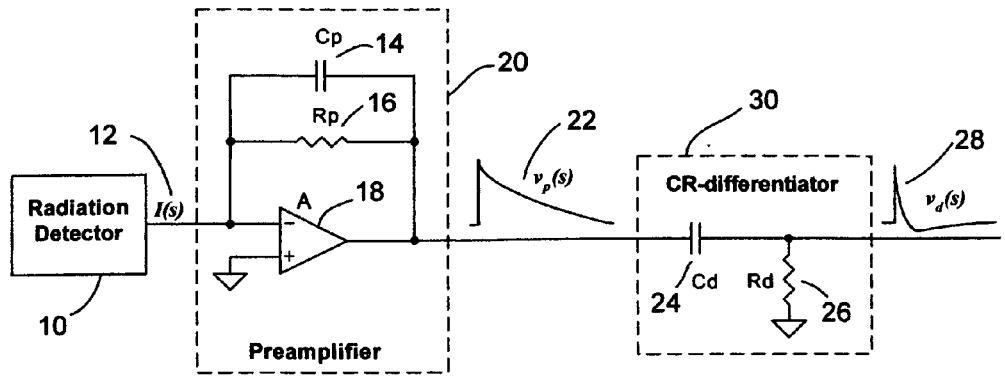
FIG. 1 is a block diagram of the basic elements of Pole-Zero network of a radiation-measurement system in accordance with the prior art.
Figure 2:
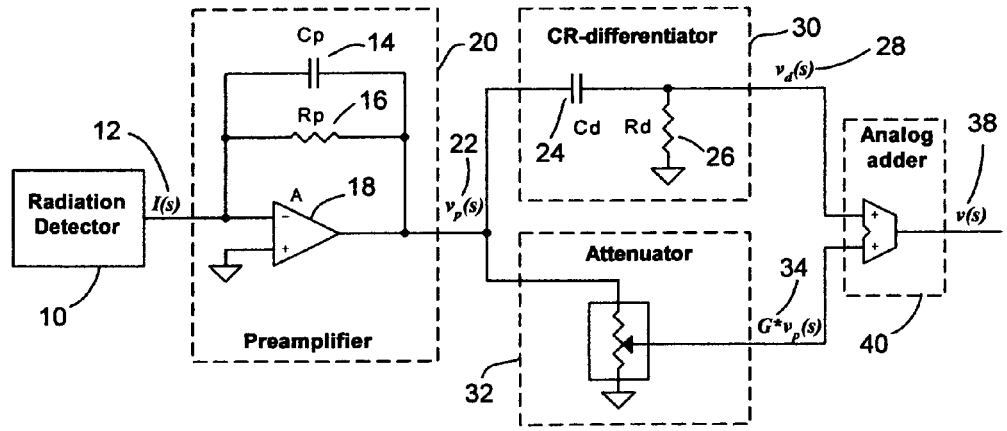
FIG. 2 is a block diagram of of Pole-Zero adjustment network using an analog attenuator in accordance with the prior art.
Figure 3:
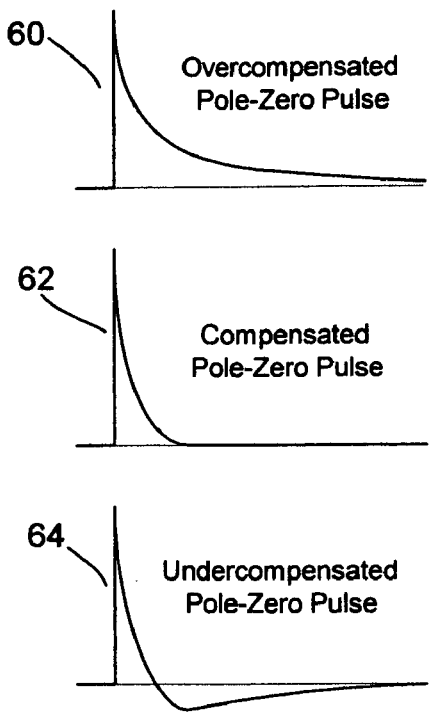
FIG. 3 is an illustration of overcompensated, compensated and undercompensated Pole-Zero Pulses.
Figure 4:
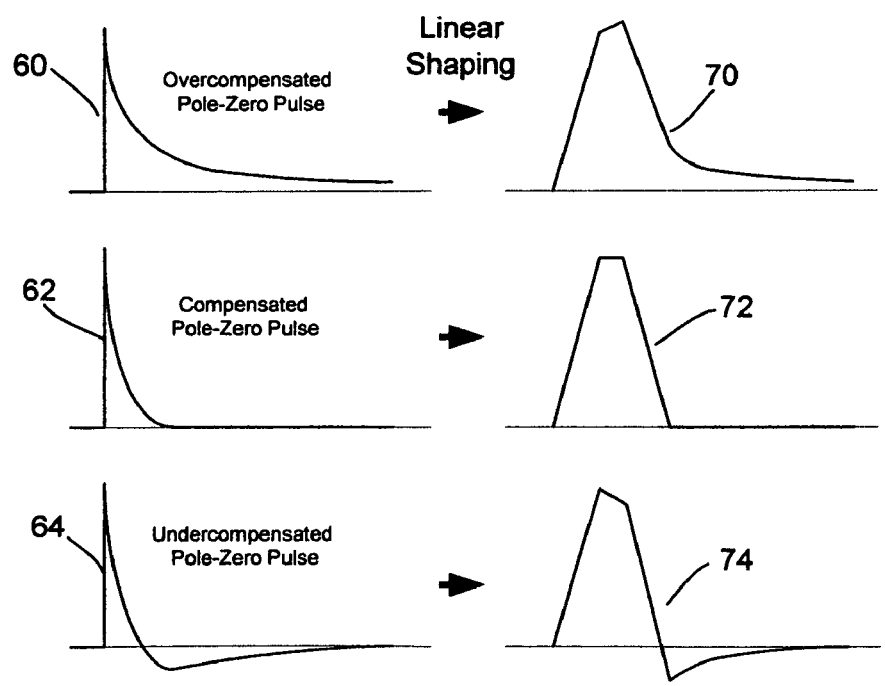
FIG. 4 illustrates the effect of Pole-Zero adjustment on pulses obtained with linear pulse-shaping.
Figure 5:
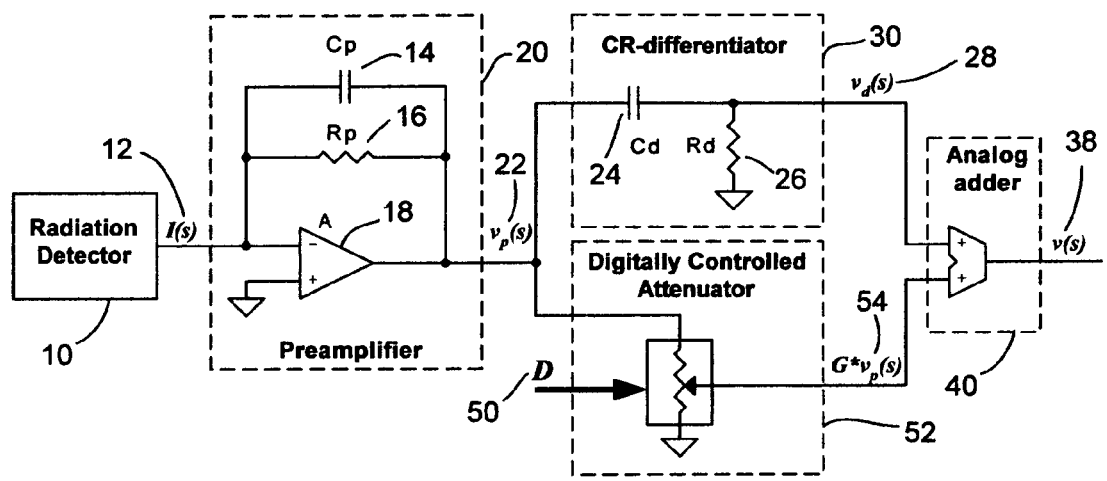
FIG. 5 is a block diagram of Pole-Zero adjustment network using a digitally controlled attenuator in accordance with the prior art.
Figure 6:
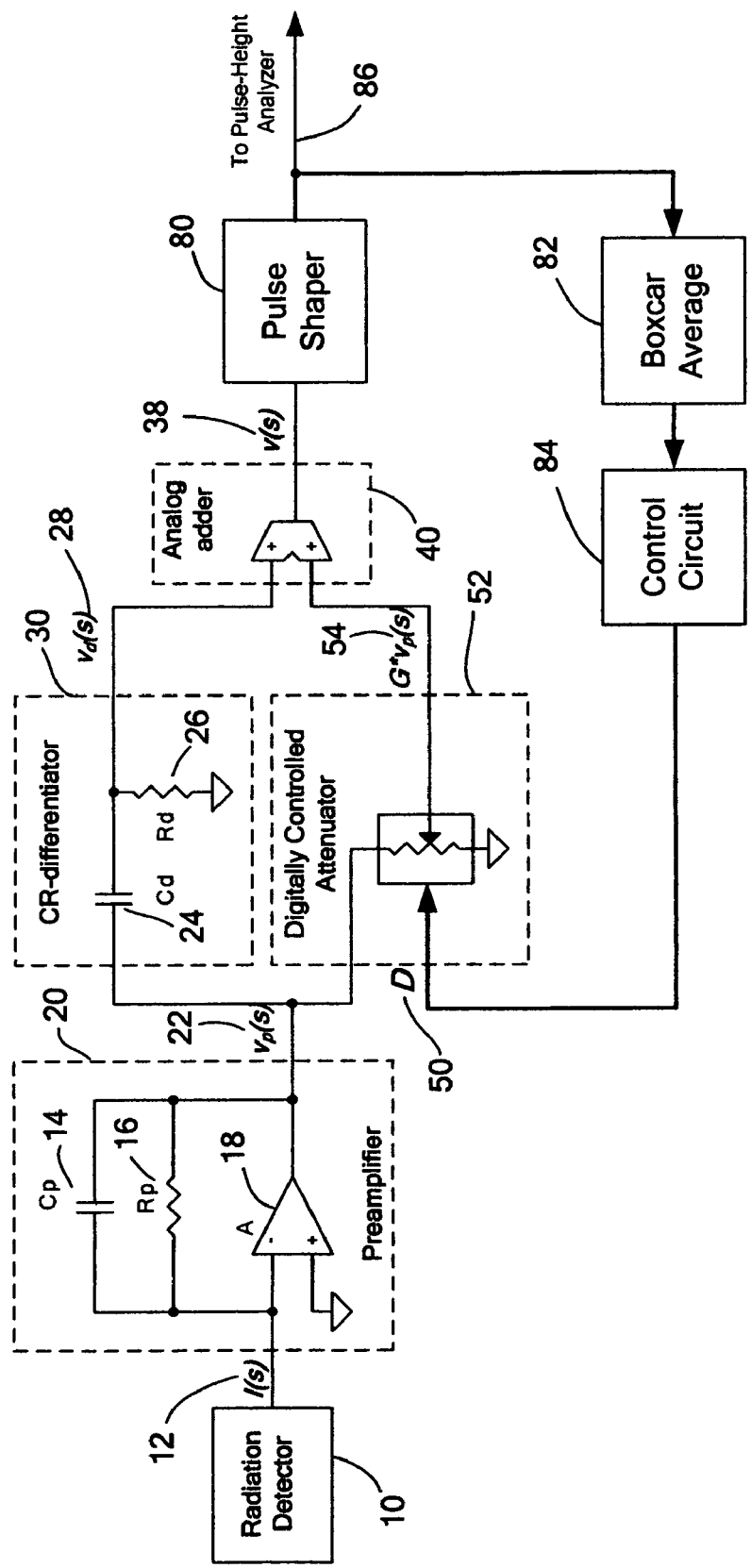
FIG. 6 is a block diagram of automatic Pole-Zero adjustment using boxcar average in accordance with the prior art.
Figure 7:
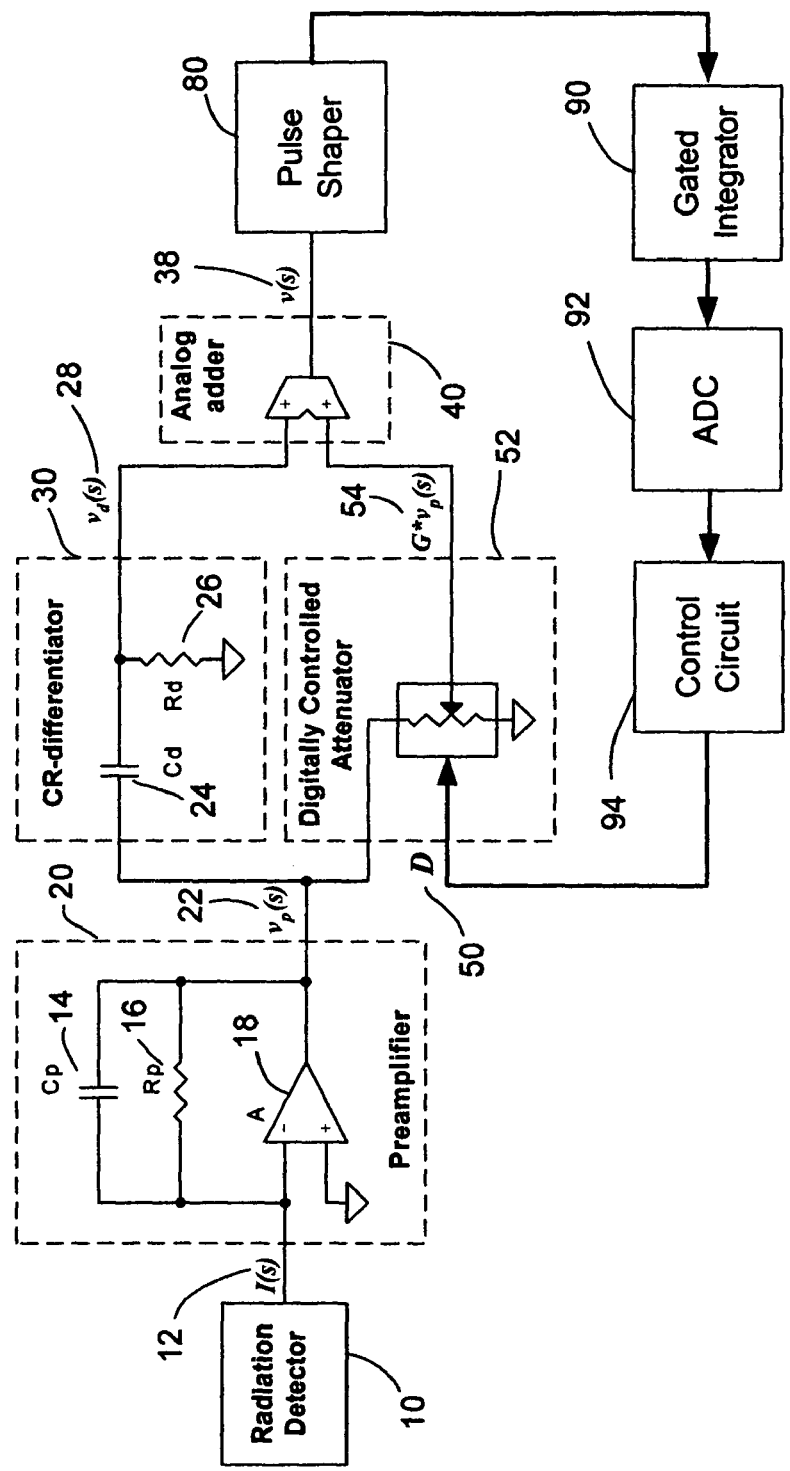
FIG. 7 is a block diagram of automatic Pole-Zero adjustment using gated integrator in accordance with the prior art.
Figure 8:
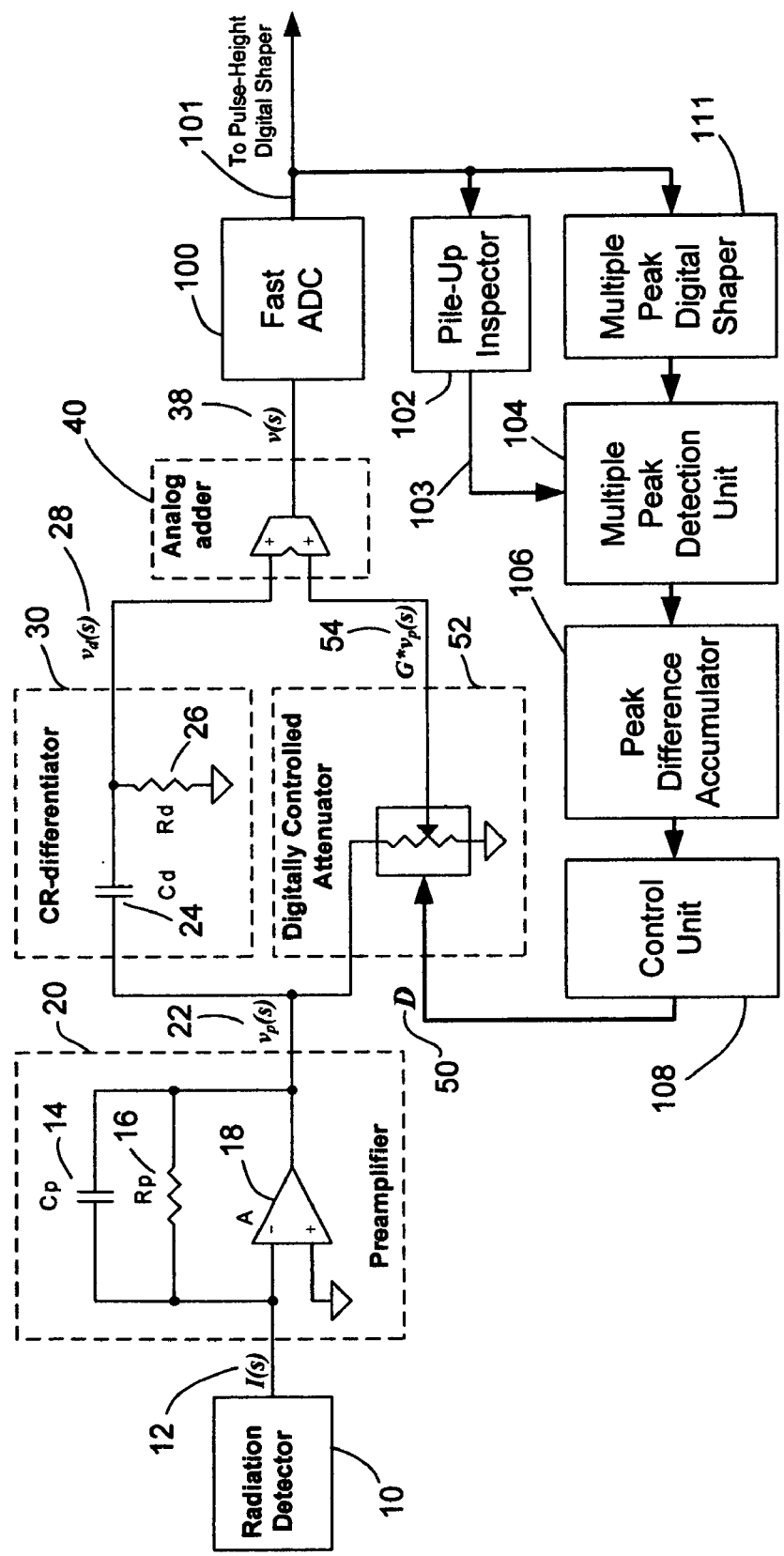
FIG. 8 is a block diagram of automatic Pole-Zero adjustment using multiple-peak pulse shapes in accordance with the invention.

The present invention is based on a new technique to automatically adjust the Pole-Zero of radiation measurement system. The block diagram of the radiation measurement system with the new automatic Pole-Zero adjustment is shown in FIG. 8. The Pole-Zero exponential pulse (38) is digitized continuously by a fast ADC (100). The fast ADC has amplification stage and digitizer that operates at high frequencies, preferably 20 MHz to 1 GHz. The digitized signal (101) from the fast ADC (100) is fed to pile-up inspector (102) and to multiple-peak digital shaper (111). The pile-up inspector (102) detects pile-up of input pulses within a predetermined time window. If pulse pile-up condition is detected the pile-up inspector generates inhibit signal (103). The multiple-peak detection unit (104) is fed by the multiple-peak digital shaper (111) as well as by the inhibit signal (103). The multiple-peak detection unit (104) detects and measures the amplitudes of all peaks in the pulse shape from the multiple-peak digital shaper (111). If inhibit signal (103) is active, the peak information is discarded. Otherwise, the peak amplitudes are passed to peak difference accumulator (106). The peak difference accumulator (106) finds the differences between the amplitude of the first peak and the amplitudes of all other peaks. The differences are accumulated for predetermined number of pile-up free pulses from the multiple-peak digital shaper (111). Once the predetermined number of pulses is reached, the accumulated sum is passed to control unit (108) which adjusts the digital value (50).

Figure 9:
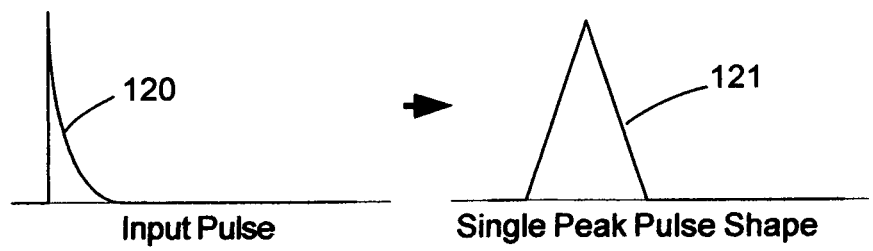
FIG. 9 is an illustration of single-peak pulse shape of the prior art.

The key of the present invention is the multiple-peak digital shaper (111). FIG. 9 shows traditional pulse shapes used in radiation spectroscopy. The traditional pulse shapers produce pulse shapes with a single peak. That is, a single input pulse (120) will result in single-peak pulse shape (121). These peak shapes offer good noise suppression and high throughputs. However, the peak values by themselves provide little information about the Pole-Zero compensation.

Figure 10:
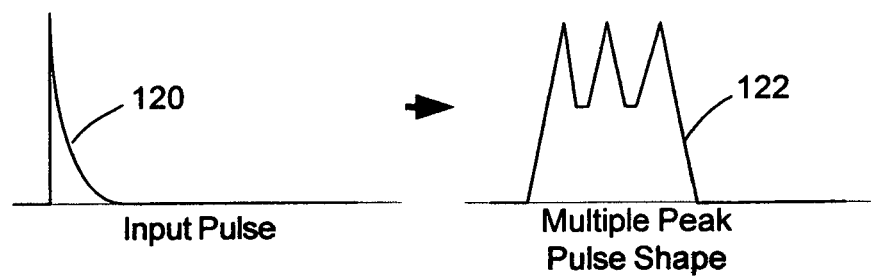
FIG. 10 is an illustration of multiple-peak pulse shape of the present invention.

The multiple-peak digital shaper responds to a single detector event by producing a shaped pulse that exhibit more than one peak as shown in FIG. 10. That is, a single input pulse (120) will result in multiple-peak pulse shape (122). In the digital domain, the amplitude and the relation between each of the multiple-peaks is fully predictable and determined. When the Pole-Zero is properly compensated, all peaks in multiple-peak pulse shape will have the same amplitude. In general, there is no restriction for the total number of the peaks in multiple-peak pulse shape, but, for practical purposes and to reduce counting losses due to pile-up pulses, with 2 peaks and not more than 10 peaks are suitable for automatic Pole-Zero compensation. In fact, double peak pulse shape offers the simplest and fastest realization of automatic Pole-Zero compensation. For illustration purpose and clarity we will show examples and will use in the explanation a case with shaped pulse with two peaks, positive amplitude.

Figure 11:
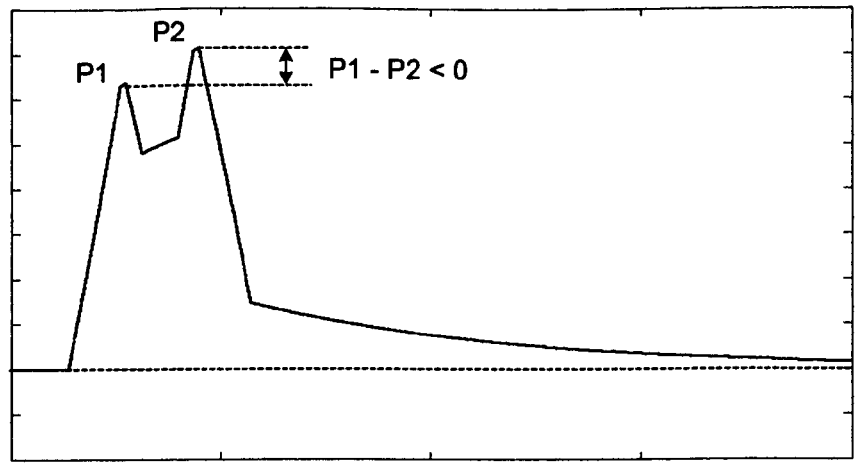
FIG. 11 is and illustration of double-peak pulse shape and the relation of the peak differences to the Pole-Zero adjustment in accordance with the present invention.
Figure 11:
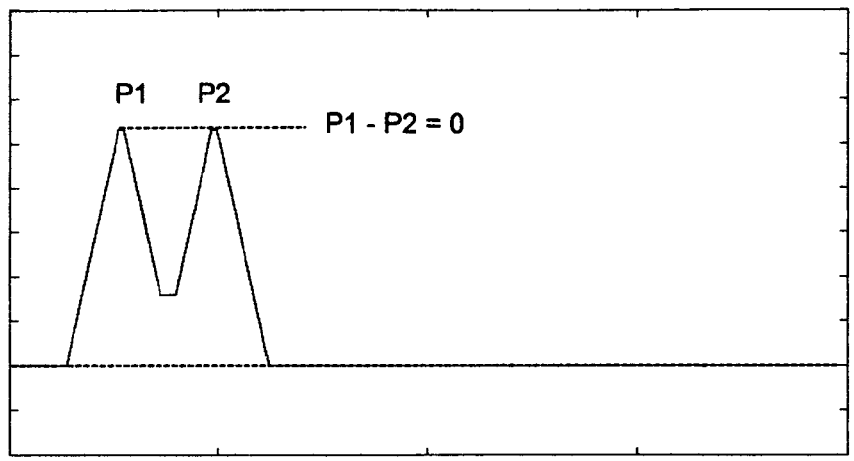
Figure 11:
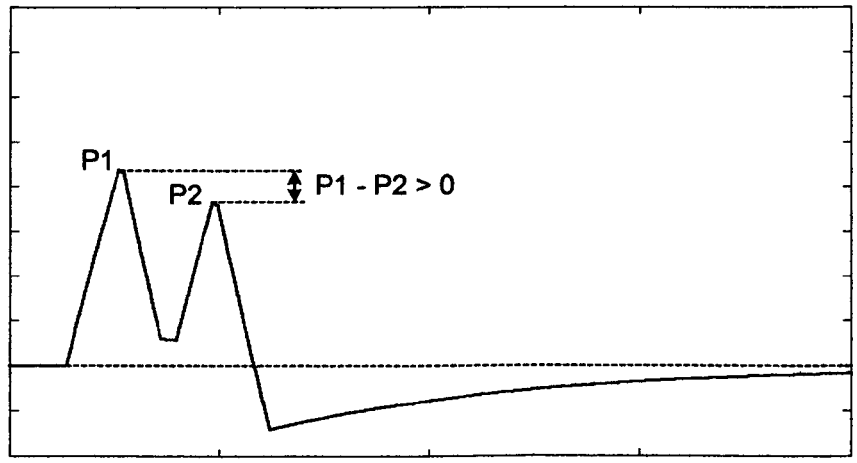

FIG. 11 shows double-peak pulse shape which is digitally shaped. This is a finite impulse response shape at proper Pole-Zero compensation. That is, there is no other tailing besides the tailing from Pole-Zero when improperly adjusted. When Pole-Zero is overcompensated the second peak P2 has larger amplitude than the first peak P1. The difference between the first peak P1 and the second peak P2 is negative. When the Pole-Zero is properly adjusted, the peak difference P1–P2 is equal to zero. When the Pole-Zero is undercompensated, the P1–P2 difference is greater than zero. Note that the baseline DC offset is canceled and has no effect on the peak difference P1–P2. So, in order to adjust the Pole-Zero automatically, first, the peak differences between the first peak and all others peaks from a single multiple-peak digital shape are obtained. To reduce statistical fluctuations the differences from multiple detector events can be added together (averaged). Once the differences are obtained, the second step is to find the sign of these differences. Third, increase attenuation of the attenuator (decrease G) if the peak differences are negative, decrease attenuation (increase G) if the peak differences are positive. Pole-Zero is properly adjusted if the differences are zero or vary around zero—that is, the peak differences are minimized.

Figure 12:
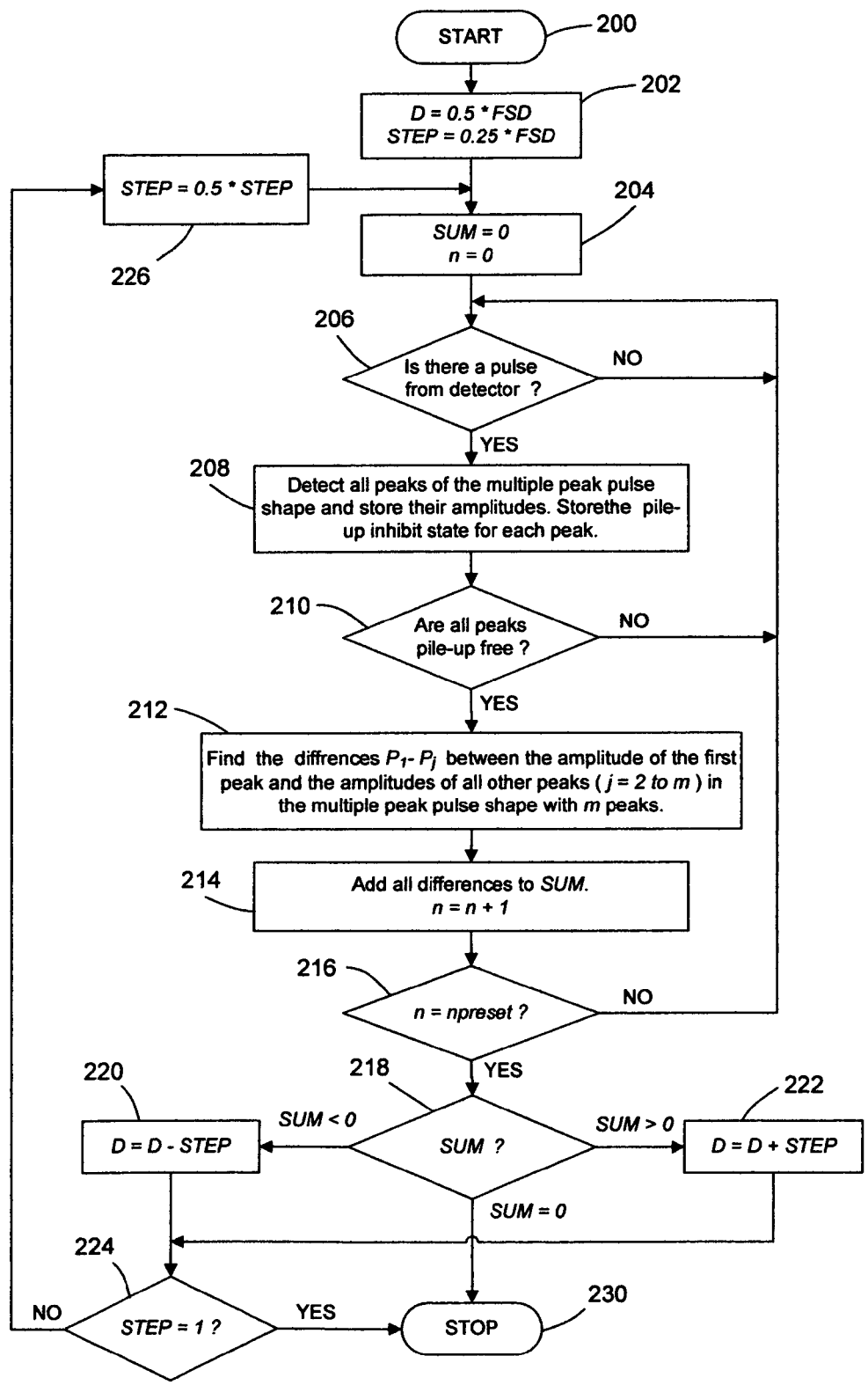
FIG. 12 is a flow chart illustrating the steps of automatic Pole-Zero adjustment using successive approximation algorithm in accordance with the present invention.

FIG. 12 shows the flowchart of the method to adjust automatically the Pole-Zero using a successive-approximation algorithm. External parameters for the flowcharts are pile-up inhibit flag; the number of all states of the digital value D (FSD) to control the digitally controlled attenuator (52); preset number of pile-up free pulses (npreset) to be added together; m—number of peaks in the Multiple-peak Pulse Shape. The value of npreset could be 1 to few thousands. For 12 bit MDAC the FSD is 4096, while the D will be between 0 and 4095.

After the routine starts (step 200) D is set to half of the FSD (step 202), the parameter STEP is set to ¼ of the FSD. (step 202). Next, the SUM is reset and the counter n of the processed pile-up free pulses is set to zero (step 204). At step 206, the routine is waiting for pulses from the detector. Once a pulse has arrived, all peaks of the multiple-peak pulse are detected and their amplitudes stored (step 208). If a pile-up inhibit flag is active, the peak measurements are discarded (step 210). If all peaks in the Multiple-peak Pulse Shape are free of pile-up, then the differences P1–Pj are created, where P1 is the amplitude of the first peak and Pj (j=2 to m) are the amplitudes of the rest of the peaks (step 212).

All differences are added to the SUM and counter n increments (step 214). Steps 206 to 216 repeat until counter n becomes equal to npreset (step 216). After counter n reaches npreset, SUM is examined for its sign and zero (step 218). If SUM is equal to zero, the automatic Pole-Zero adjustment is completed, routine stops (step 230). If SUM is negative, D is decreased by STEP (step 220), if SUM is positive, D is increased by STEP (step 222). After D is adjusted the routine checks if STEP is equal to one (step 224). If true, the automatic Pole-Zero adjustment is completed (step 230). If false, the step is decreased by half (step 226) and routine starts new cycle beginning from step 204.

Figure 13:
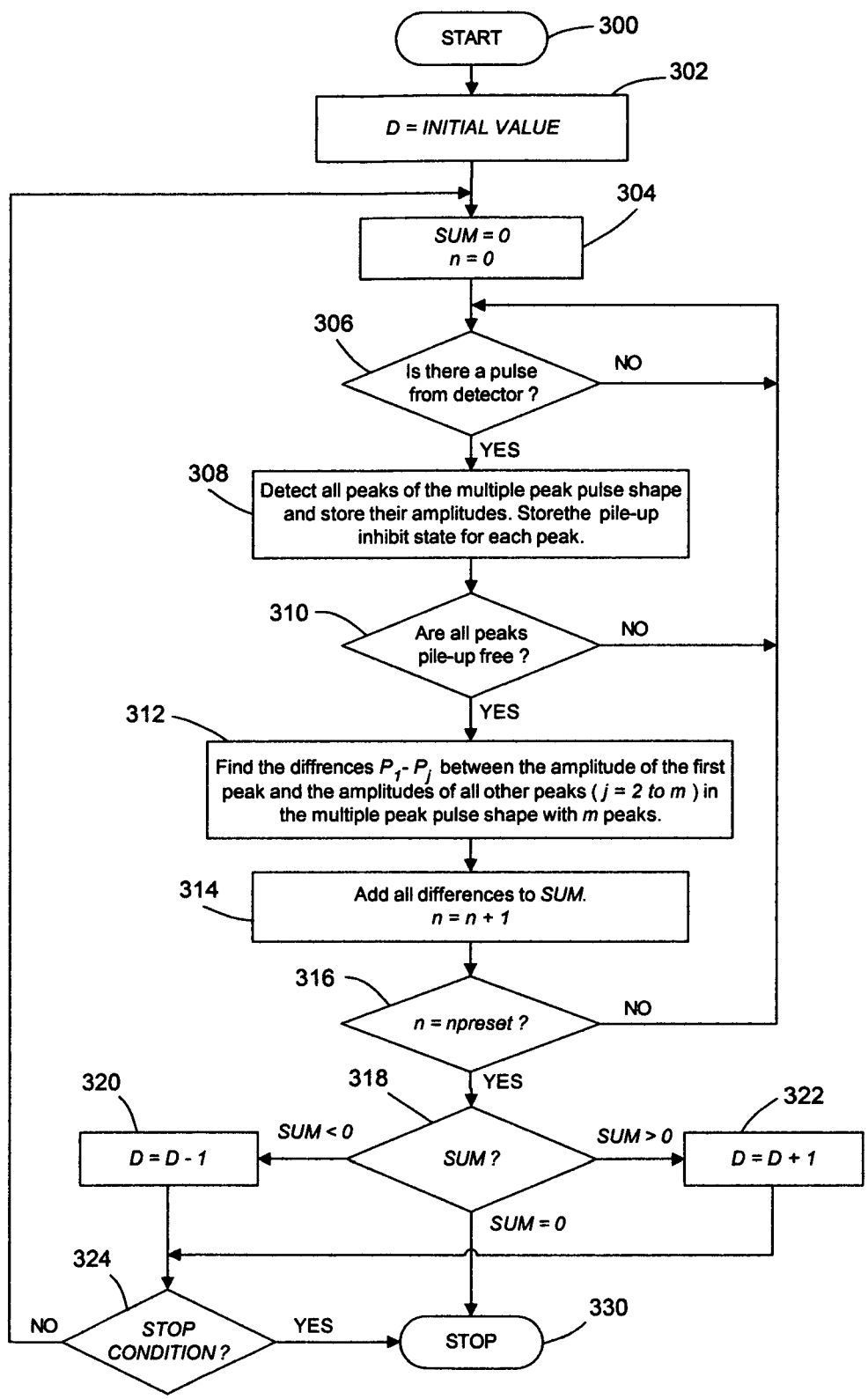
FIG. 13 is a flow chart illustrating the steps of automatic Pole-Zero adjustment using sequential adjustment algorithm in accordance with the present invention.

FIG. 13 shows the flowchart of the method when using a step increment of the digital value D. The routine is similar to the routine in FIG. 12. but it is much slower. There is no STEP parameter. There is a stop condition which could be the number of alternative increments/decrements of D, or when D stays within small range for predetermined number of increments/decrements.

The routine in FIG. 13 starts (step 300) and then D is set to initial value within the range of D (step 302). Next, the SUM is reset and the counter n of the processed pile-up free pulses is set to zero (step 304). At step 306 the routine is waiting for pulses from the detector. Once a pulse has arrived, all peaks of the multiple-peak pulse are detected and their amplitudes stored (step 308). If a pile-up inhibit flag is active, the peak measurements are discarded (step 310). If all peaks in the Multiple-peak Pulse Shape are free of pile-up, then the differences P1–Pj are created, where P1 is the amplitude of the first peak and Pj (i=2 to m) are the amplitudes of the rest of the peaks (step 312).

All differences are added to the SUM and counter n increments (step 314). Steps 306 to 316 repeat until counter n becomes equal to npreset (step 316). After counter n reaches npreset SUM is examined for its sign and zero (step 318). If SUM is equal to zero, the automatic Pole-Zero adjustment is completed and the routine stops (step 330). If SUM is negative, D is decreased by one (step 320). If SUM is positive, D is increased by STEP (step 322). After D is adjusted, the routine checks if STEP if stop condition is met (step 324). If the stop condition is met, the automatic Pole-Zero adjustment is completed and the routine stops (step 330). If the stop condition is not met, the routine starts a new cycle beginning from step 304.

In the embodiments of the present invention described above, it will be recognized that individual elements and/or features thereof are not necessarily limited to a particular embodiment but, where applicable, are interchangeable and can be used in any selected embodiment even though such may not be specifically shown.

It will thus be seen that the objects set forth above, among those elucidated in, or made apparent from, the preceding description, are efficiently attained and, since certain changes may be made in the above method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method for performing automatic adjustment of the Pole-Zero adjustment circuitry in a radiation measurement system, the radiation measurement system comprising pulse processing circuitry, said method comprising the steps of:
    (a) receiving within the pulse processing circuitry a plurality of pulses from an ionizing radiation detector;
    (b) for each said plurality of pulses, automatically synthesizing, within the pulse processing circuitry, a multiple-peak pulse shape; and
    (c) using the amplitude measurement of individual peaks in each of said multiple-peak pulse shape to adjust the Pole-Zero of the radiation measurement system.

2. A method in accordance with claim 1, further including: a step of detecting and measuring amplitudes of all peaks in said multiple-peak pulse shape.

3. A method in accordance with claim 2, further including: a step of rejecting amplitude measurements of multiple-peak pulse shapes whose peaks are not pile-up free.

4. A method in accordance with claim 3, further including: a step of finding peak differences between amplitude of first peak in said multiple-peak pulse shape and all other peaks in said multiple-peak pulse shapes.

5. A method in accordance with claim 4, further including: a step of obtaining a peak difference sum by adding together peak differences obtained from a plurality of said amplitude measurements of peaks of said multiple-peak pulse shapes.

6. A method in accordance with claim 5, further including: a step of adjusting said Pole-Zero adjustment circuitry of said radiation measurement system until peak difference sum is minimized.

7. A radiation measurement system, the system comprising:
    pulse processing circuitry for receiving the pulse output from an ionizing radiation detector, the pulse processing circuitry comprising:
    Pole-Zero adjustment circuitry; and
    multiple-peak pulse shaping and detection circuitry for synthesizing a multiple-peak pulse shape for controlling the Pole-Zero adjustment.

8. The system of claim 7, wherein the amplitude measurement of the individual peaks in each multiple-peak pulse shape is used to adjust the Pole-Zero adjustment circuitry.

9. The system of claim 8 further comprising:
    pulse pile-up detection circuitry for rejecting the amplitude measurements of multiple-peak pulse shapes whose peaks are not pile-up free.

10. The system of claim 9 wherein the pulse processing circuitry computes peak differences between the amplitude of the first peak in the multiple-peak pulse shape and all other peaks in the multiple-peak pulse shapes.

11. The system of claim 10 wherein the pulse processing circuitry obtains a peak difference sum by adding together peak differences obtained from a plurality of the amplitude measurements of peaks of the multiple-peak pulse shapes.

12. The system of claim 11 wherein the pulse processing circuitry adjusts the Pole-Zero adjustment circuitry until the peak difference sum is minimized.

* * * * *

UNITED STATES PATENT AND TRADEMARK OFFICE
CERTIFICATE OF CORRECTION

PATENT NO. : 7,725,281 B2  Page 1 of 1
APPLICATION NO. : 12/004128
DATED : May 25, 2010
INVENTOR(S) : Valentin T. Jordanov It is certified that error appears in the above-identified patent and that said Letters Patent is hereby corrected as shown below:

Column 5, line 40, please change [(i=2 to m)] to -- (j=2 to m) -- to read "first peak and Pj (j=2 to m)".

Signed and Sealed this

Third Day of August, 2010

David J. Kappos
*Director of the United States Patent and Trademark Office*